UNITED STATES PATENT OFFICE.

JOHN WESLEY ALEXANDER, OF PARKERSBURG, WEST VIRGINIA, ASSIGNOR OF ONE-HALF TO PERCY C. PARKER, OF PARKERSBURG, WEST VIRGINIA.

VARNISH AND PAINT REMOVER.

1,051,978.　　Specification of Letters Patent.　　Patented Feb. 4, 1913.

No Drawing.　　Application filed December 11, 1909. Serial No. 532,627.

*To all whom it may concern:*

Be it known that I, JOHN WESLEY ALEXANDER, a citizen of the United States, residing at Parkersburg, in the county of Wood and State of West Virginia, have invented a new and useful Varnish and Paint Remover, of which the following is a specification.

It is the object of the present invention to provide a highly efficient compound for removing varnish and paint from wood, metal, or other surfaces to which such varnish or paint has been applied and the invention aims further to provide a compound of this class which may be employed in removing any resinous matter from wood or metal surfaces.

It is further an aim of the invention to provide in a compound of this class for this purpose, an ingredient or ingredients which will cut and soften the varnish or paint to be removed, and ingredients which will form a scum or will otherwise prevent too rapid evaporation of the ingredient which is employed to cut and soften the varnish or paint; a detergent; a cleansing and bleaching agent and one which will cause the paint or varnish to rise to the surface when the compound is applied; and ingredients to prevent drying of the paint or varnish while being removed.

In preparing the compound embodying the present invention, the following ingredients in about the proportions specified are employed: benzol (commercial grade, 90 per cent.), two ounces; acetone (85 per cent. pure), one ounce; soap (dissolved), one-third ounce; melted paraffin wax, one-fifth ounce; peroxid of hydrogen, one-quarter ounce; linseed oil, one ounce; oil of wintergreen, one-quarter ounce. These ingredients are thoroughly mixed and agitated and are permitted to stand for a period of about forty-eight hours when the compound will be ready for use. The acetone and benzol act to cut and soften the varnish or paint or other resinous or oily substance to be removed and the paraffin wax forms a scum which prevents too rapid evaporation of the acetone and benzol. The soap is preferably a pure laundry soap and this ingredient, in any event, acts as a detergent acting not only to clean the surface being treated of paint and varnish or grease or resinous substance, but also to remove dirt from such surface. The soap solution also renders the mixed paint or varnish and compound heretofore described, less sticky and gummy than it would otherwise be and in the accomplishment of this result, the linseed oil and the paraffin wax also aid. The peroxid of hydrogen employed acts to cleanse the surface being treated and causes the paint or varnish removed from such surface to rise to the surface of the compound when applied and furthermore when the surface to be treated is wood or like material, it will be bleached to a greater or less degree thereby preparing it for the application of new paint or varnish. The linseed oil employed in manufacturing the compound acts to prevent evaporation of the paint and varnish remover.

From the foregoing description of the compound embodying the present invention, it will be appreciated that the same is, by reason of the characteristics of the ingredients embodied therein, well adapted for use in removing paint, varnish, dirt, grease, and in fact any greasy substance or resinous substance from wood, metal, or in fact almost any surface. It will further be understood that whether paint, varnish or a resinous or greasy substance is removed, the mixture of this substance with the compound will not become sticky or gummy and consequently the compound is not undesirable to use at the same time obviating gumming of the surface being cleaned. This is a decided advantage inasmuch as most compounds of this class dry so rapidly and are composed of such ingredients that the surface being cleaned becomes sticky or gummy after exposure for a few moments to the air although apparently entirely free from the paint or varnish. A decided advantage is also gained in the use of the peroxid of hydrogen inasmuch as stated above, as this ingredient serves to not only cleanse the surface being treated but where such surface is of wood, it will be bleached to a greater or less degree thus well preparing it for the application of new varnish or paint.

What is claimed is:

A paint removing compound composed of the following ingredients in substantially the proportions specified: benzol (90°) 2 oz., acetone (85°) 1 oz., soap ⅛ oz., melted paraffin ¼ oz., peroxid of hydrogen ¼ oz., linseed oil 1 oz., and oil of wintergreen ¼ oz.

In testimony that I claim the foregoing as my own, I have hereto affixed my signature in the presence of two witnesses.

JOHN WESLEY ALEXANDER.

Witnesses:
 DWIGHT D. McKINNEY,
 A. H. WILSON.